United States Patent
Juntunen

(10) Patent No.: US 7,710,951 B2
(45) Date of Patent: May 4, 2010

(54) SIGNALING METHOD AND SIGNALING ARRANGEMENT

(75) Inventor: Asko Juntunen, Oulu (FI)

(73) Assignee: Kone Corporation, Helsinki (FI)

( * ) Notice: Subject to any disclaimer, the term of this patent is extended or adjusted under 35 U.S.C. 154(b) by 1401 days.

(21) Appl. No.: 11/095,495

(22) Filed: Apr. 1, 2005

(65) Prior Publication Data

US 2005/0195806 A1 Sep. 8, 2005

Related U.S. Application Data

(63) Continuation of application No. PCT/FI03/00722, filed on Oct. 3, 2003.

(30) Foreign Application Priority Data

Oct. 4, 2002 (FI) .................................. 20021768

(51) Int. Cl.
*H04Q 11/00* (2006.01)

(52) U.S. Cl. .................... 370/360; 370/496; 370/503; 340/527; 340/539.22

(58) Field of Classification Search ................ 370/400, 370/401, 489, 503, 522; 340/527
See application file for complete search history.

(56) References Cited

U.S. PATENT DOCUMENTS

| | | | | |
|---|---|---|---|---|
| 3,611,361 A | * | 10/1971 | Gallichotte et al. | ......... 340/505 |
| 3,792,470 A | * | 2/1974 | Donovan et al. | ............ 340/509 |
| 3,815,093 A | * | 6/1974 | Caretto et al. | ................ 340/505 |
| 4,077,030 A | * | 2/1978 | Helava | .................... 340/870.13 |
| 4,103,293 A | * | 7/1978 | La Forge, Jr. | ................ 340/514 |
| 4,163,226 A | * | 7/1979 | Ogawa | ........................ 340/629 |
| 4,603,318 A | | 7/1986 | Philp | |
| 4,612,534 A | * | 9/1986 | Buehler et al. | ............... 340/505 |
| 4,737,657 A | * | 4/1988 | Jatko et al. | ..................... 307/85 |
| 5,140,622 A | * | 8/1992 | Shino et al. | .................... 377/20 |
| 5,168,273 A | * | 12/1992 | Solomon | ............... 340/870.05 |

* cited by examiner

*Primary Examiner*—Chirag G Shah
*Assistant Examiner*—Daniel Mitchell
(74) *Attorney, Agent, or Firm*—Birch, Stewart, Kolasch & Birch, LLP

(57) ABSTRACT

The invention relates to a signaling method for a network system. In this solution, a common analog read signal is fed via a signaling channel to all nodal units under control of a control unit. The read signal is modified by modification means units at each nodal unit for identification of the nodal unit and data indicating the state of each nodal unit is added to the read signal. In the control unit, the state of each nodal unit is determined based on the modification made and the read signal.

26 Claims, 3 Drawing Sheets

SIGNALING METHOD AND SIGNALING ARRANGEMENT

Figure 1:
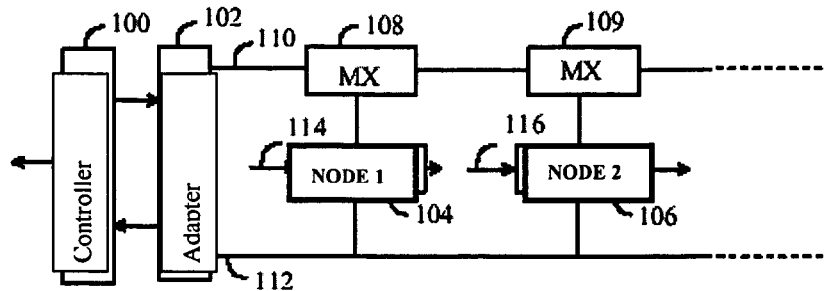

The present invention relates to a signaling solution for a network system, wherein signaling is carried out between a nodal point and a control unit.

BACKGROUND

In machine automation, there is a growing trend of transition from centralized systems towards decentralized systems, in which intelligent functions, coordination between different components comprised in a system, diagnosing and control are increasing. Decentralized systems are network systems, in which the nodal units and the control units controlling them are connected to each other via signaling channels. The signaling channels used consist of wired cables. Decentralized systems are often designed with an aim to make it easy to integrate the nodal units or nodes with the devices or components to be monitored, thus allowing easy, reliable, cost-effective and, if desirable, real-time monitoring and control of the devices and components.

However, the applicability of decentralized systems has been limited by a lack of suitable data transfer solutions. In decentralized systems, each nodal unit usually has an address by means of which the control unit identifies the nodal unit to read or control its state. To allow the state of the nodal unit to be read or controlled, it is also necessary to have a clock signal for the timing of the signaling. The use of an address and a clock signal makes especially nodal units complicated digital state machines that require space. To enable data to be transferred between the nodal unit and the control unit in serial mode, it is further necessary to have a data transfer protocol and protocol circuits, which require regulated operating voltages. The supply of operating voltage together with the regulating circuits makes the structure of the nodal units still more complicated. The software for the protocol and other functions again requires plenty of development work and is usually intrinsic to each commercial system, which further complicates the use of network systems. Because of these problems, network systems are expensive to acquire, operate and maintain.

BRIEF DESCRIPTION

The object of the present invention is to provide an improved method and a system implementing the method, wherein signaling is simplified. This is achieved by a signaling method for a network system, wherein a control unit communicates over a wired signaling channel with at least one nodal unit, each one of said nodal units being associated with at least one device to be monitored, and in which method the signaling is carried out over a signaling channel between each nodal unit and the control unit. Further in the method, an analog read signal common to all nodal units is fed via the signaling channel under control of the control unit; the read signal is modified at each nodal unit to allow identification of the nodal unit; data indicating the state of each nodal unit is added to the read signal; and the state of each nodal unit is determined in the control unit by means of the modification made and the read signal.

The invention also relates to a signaling method for a network system wherein a control unit communicates over a wired signaling channel with at least one nodal unit, each one of said nodal units being associated with at least one device to be monitored, and in which method the signaling is carried out over the signaling channel between each nodal unit and the control unit. Further in the method, an analog read signal, which is a direct-current voltage signal of desired level, is fed to all nodal units via the signaling channel under control of the control unit, the states of the nodal units are read serially one by one without a separate clock signal in such manner that, at each nodal unit, the propagation of the direct-current voltage signal to the next nodal unit is delayed for a time exceeding the duration of the read operation; and within a predetermined read time window the value of the electric current produced by the direct-current voltage signal is set in each nodal unit to a level corresponding to the state of the nodal unit according to the nodal unit impedance across which the d.c. voltage signal is applied, and the state of each nodal unit is determined in the control unit in serial mode by means of the intensity value of the electric current signal received according to different delays from each nodal unit.

The invention also relates to a signaling arrangement for a network system comprising a control unit and at least one nodal unit, which communicate with each other over a wired signaling channel, each of said nodal units being associated with at least one device to be monitored. Further, the control unit has been fitted to control the supply of an analog read signal common to all the nodal units over the signaling channel; the arrangement comprises modifying means for the modification of the read signal at each nodal unit to allow the nodal units to be distinguished from each other; each nodal unit has been fitted to add data indicating the state of each nodal unit to the read signal; and the control unit has been fitted to determine the state of each nodal unit by means of the read signal and the modification made by the modifying means.

The invention further relates to a signaling arrangement for a network system comprising a control unit and at least one nodal unit communicating with each other over a wired signaling channel, each of said nodal units being associated with at least one device to be monitored. Further, the control unit has been fitted to control the supply of a direct-current voltage signal used as an analog read signal to all the nodal units over the signaling channel; and the arrangement comprises modification units for reading the states of the nodal units without a separate clock signal, said modification units being fitted to delay the connection of the direct-current voltage signal at each nodal unit to the next nodal unit for a time exceeding the length of the read time window; and delay units fitted to form a predetermined read time window, during which the direct-current voltage signal is connected to each nodal unit; and each nodal unit comprises an impedance circuit corresponding to the state of the nodal unit, across which circuit the direct-current voltage signal is applied and by means of which each nodal unit has been fitted to set within the predetermined read time window the value of the electric current produced by the direct-current voltage signal to a level corresponding to the state of the nodal unit, and the control unit has been fitted to determine the state of each nodal unit in serial mode by means of the intensity value of the electric current signal coming from each nodal unit according to different delays.

Preferred embodiments of the invention are described in the sub-claims.

The invention is based on the principle of feeding to all nodal units a common analog signal, which is modified in a nodal unit-specific manner and to which is also added information corresponding to the state of each nodal unit. Thus, when the signal is received in the control unit, the state of each nodal unit can be distinguished from the state of the other nodal units by means of the node-specific modification.

The method and system of the invention provide several advantages. The solution requires no program or protocol for the execution of the operations. Thus, the structure is simplified and the price of the network system is reduced. The solution only requires a small number of channel conductors. The solution can be implemented in a cost-effective manner with a small number of electronic components for each nodal unit, which also means a small space requirement.

LIST OF FIGURES

Figure 2:
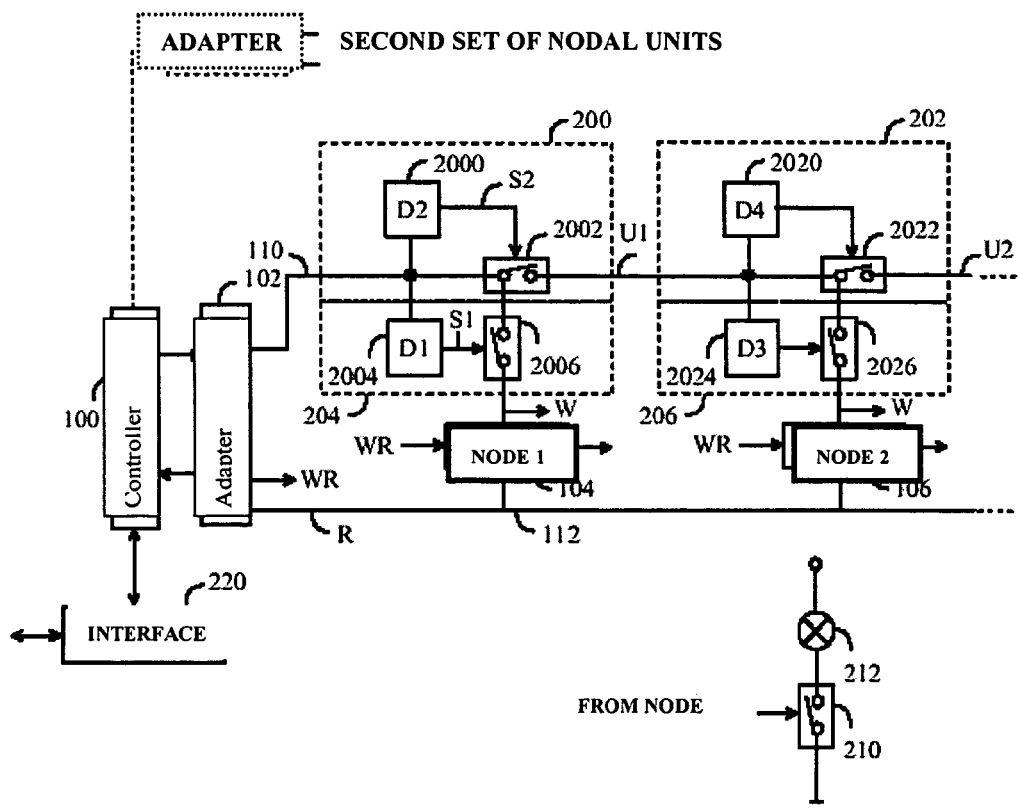
Figure 3:
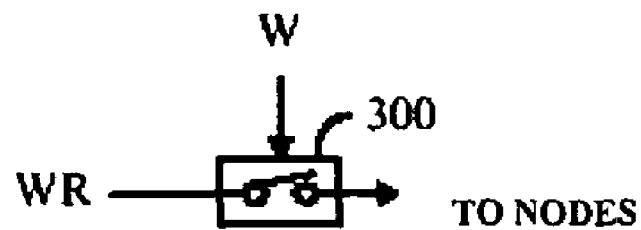
Figure 4:
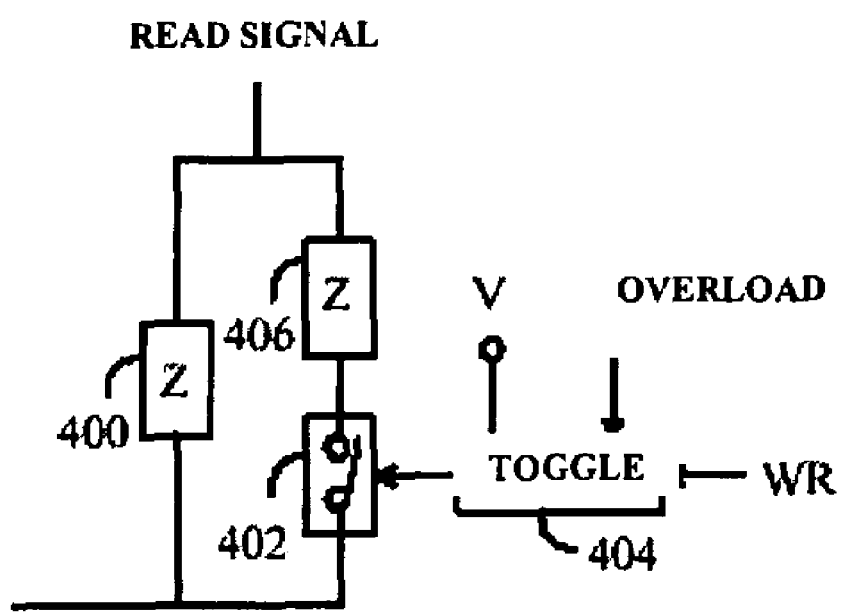
Figure 5:
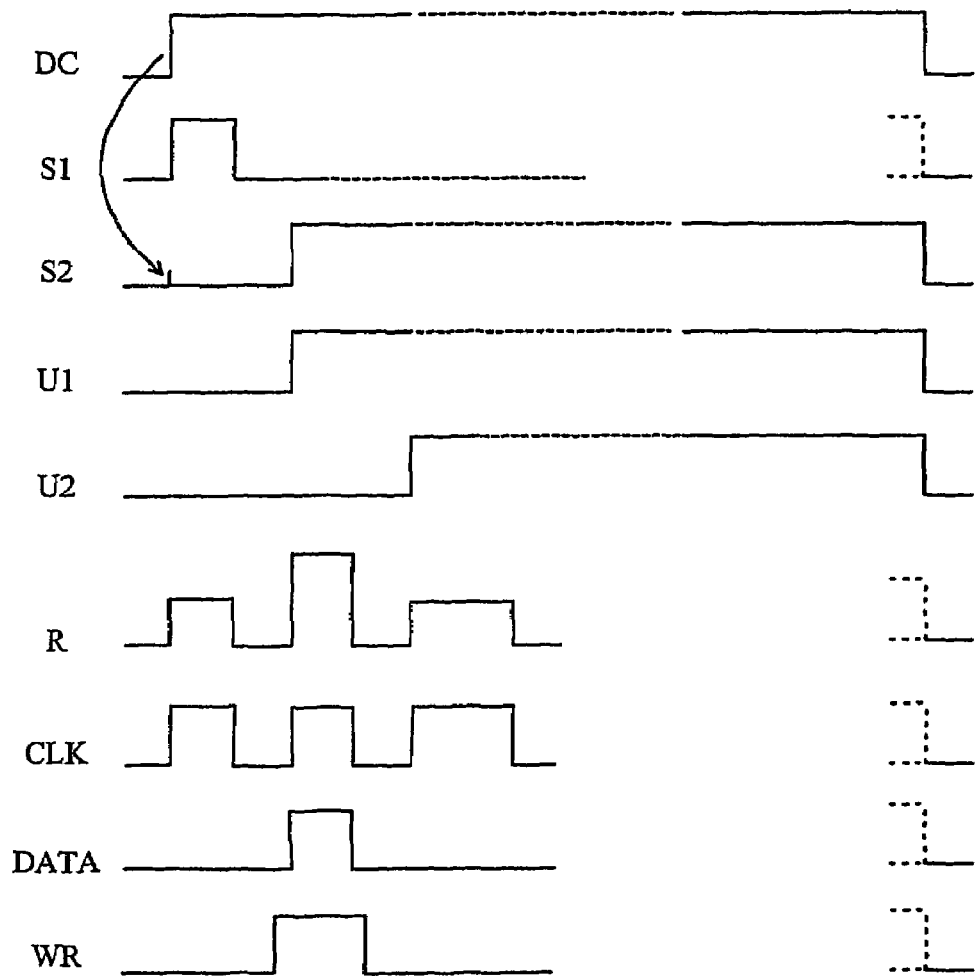

The invention will now be described in detail in connection with preferred embodiments with reference to the attached drawings, wherein FIG. 1 presents a network system according to the disclosed solution, FIG. 2 presents a time-division network system, FIG. 3 represents the operation of writing to a nodal unit, FIG. 4 represents the operation of reading of and writing to a nodal unit, and FIG. 5 presents signal timing diagrams.

DESCRIPTION OF EMBODIMENTS

The disclosed network system can work independently or the disclosed network system may form a subsystem belonging to a larger system. The disclosed solution can be applied in homes, hotels, cars, elevators, alarm systems, in robotics, industrial automation, and so on.

FIG. 1 presents a network system according to the disclosed solution on a general level. A control unit 100 monitors the state of nodal units 104-106, and it also changes the state of the nodal units 104-106 when necessary. The control unit 100 may be an ordinary digital control circuit, whose signaling is adapted by an adapter 102 to the nodal units. The adapter 102 converts the digital control signal into the desired analog signal and the adapter converts the signal received from the nodal units into a form suited for digital signal processing of the signal. An adapter 102 is not necessarily needed if the control unit can generate the required signals itself and is also able to process the received signal. When the state of the nodal units is merely to be read, the solution comprises a conductor pair serving as a signaling channel, wherein conductor 110 feeds the read signal to the nodal units 104-106 and conductor 112 transmits the read signal containing state data from the nodal units 104-106 to the control unit 100. These conductors 110 and 112 form a conductor pair. The read signals coming from different nodal units are modified in modification units 108-109 to make the signals differ from each other to allow identification of the nodal units, which in a general case may be placed before the nodal units or after the nodal units as in FIG. 1. The nodal unit can monitor and control an electronic device, which may be a part of e.g. a car, an alarm system, an elevator or the like.

In the case illustrated in FIG. 1, under control of the control unit 100, a common analog read signal is fed through the conductor 110 serving as a signaling channel to all the nodal units 104-106 either directly from the control unit 100 or from the adapter 102. The read signal may be a direct-current voltage signal or a signal having a desired frequency band. In each nodal unit 104-106, data indicating the state of each nodal unit is added to the read signal. Information is stored on the read signal in binary form. 1-bit data is often sufficient but, if necessary, multiple-bit data may also be used. The information can be stored in the amplitude, phase or frequency of the read signal. The modification units 108-109 modify the read signal for each nodal unit so that the nodal unit can be identified in the control unit on the basis of the modification. This modification may consist of an operation performed in the time domain, such as delaying, or an operation performed in the frequency domain, such as modification of the frequency band by filtering. Finally, the states of the nodal units 104-106 are determined in the control unit 100 on the basis of the read signal received via conductor 112 of the signaling channel and the modifications made by the modification units. The new state of the nodal units can be written through conductors 114-116, which are functionally connected to the control unit 100.

Referring to FIG. 2, let us now consider a functional mode of the disclosed solution wherein the reading of the states of the nodal units is performed in serial mode using a DC voltage signal. In the solution, it is thus not necessary to use any nodal unit-specific operating voltages or regulation of operating voltages. Under control of the control unit, a common analog read signal, in this case a DC voltage signal of desired level, is fed through conductor 110 of the signaling channel to all nodal units 104-106 either directly from the control unit 100 or from the adapter 102. The states of the nodal units 104-106 are read one by one in serial mode in such manner that the propagation of the DC voltage signal to the next nodal unit is delayed at each nodal unit by modification units 200-202 for a time exceeding the read time window. In modification unit 200, the delay is produced in such manner that, after the rising edge of the direct-current voltage, switch 2002 is only triggered into the conducting state by delay unit 2000 after a predetermined delay, which is at least as long as or longer than the time window of the read delay of delay means 2004. The state of nodal point 104 is read in such manner that, within a predetermined read time window, the value of the electric current produced by the direct-current voltage is set to a level corresponding to the state of the nodal unit 104. The value of the electric current can be changed e.g. by changing the impedance of the nodal unit 104 across which the direct-current voltage signal is applied. The read time window is produced by delay unit 204, wherein delay unit 2004 triggers switch 2006 into the conducting state for the time required by the read operation after the DC voltage has risen in conductor 110. When the read delay is over, the delay means 2004 turns switch 2006 off, which therefore prevents signaling to nodal point 104. When switch 2002 of modification unit 200 is turned on after a predetermined delay, delay means 2020 and switch 2022 in delay unit 202 produce a delay before the direct-current voltage is connected to the next nodal unit, in the same way as delay means 2000 and switch 2002 in delay unit 200 do. In a corresponding manner, delay means 2024 and switch 2026 in delay unit 206 make it possible to read nodal unit 106 in the same way as delay means 2004 and switch 2006 in modification unit 204 do. Since each nodal unit 104-106 generates a current impulse corresponding to its own state in accordance with the predetermined delays produced by the modification units 200-202 and the delay units 204-206, the state of each nodal unit can be determined in the control unit 100 in serial mode on the basis of the intensity values of the electric current signals received in succession from each nodal unit. In this process, the adapter 102 generates a clock signal used for timing in such manner that, when each modification unit 200-202 receives a rising DC voltage signal, the clock signal has a rising edge at the same time (see FIG. 5). In the disclosed solution, it is not necessary to connect a separate clock signal to the nodal units. Instead, via the modification units and delay units, the nodal units produce mutual synchronization of the signals, and thus each nodal unit determines its own timing.

Another notable feature of the disclosed solution is that the direct-current voltage signal serves as an operating voltage for the modification units and delay units, which can be integrated as parts of each nodal unit. When the read operation is terminated (thereby terminating the write operation as well), the operating voltages to the modification units and delay units are switched off, and therefore the disclosed solution does not consume any electric energy except when the states of the nodal units are being read (and written). The DC voltage may have a value of tens of volts, e.g. 12 V or 36 V. In the disclosed solution, however, the DC voltage value is not essential. In the disclosed solution, the nodal units synchronize their operation themselves, and no nodal unit-specific operating voltages or regulation of operating voltages are needed. Due to the simplicity of the disclosed solution, no programs or protocols controlling the operation are needed, either.

In FIG. 2, nodal unit 1 may be e.g. a sensor providing measurement data to be read according to the disclosed solution. Nodal unit 2 may be controlling a switch 210, which e.g. switches a signal lamp 212 on and off. If the network system includes additional nodes, some of these may also contain switches used for direct control of a device to monitored. For example in a car, nodal units can be used to monitor and control the headlights. In this case, when the headlight switch is set to turn on the headlights, the signal advances from the switch to the controller, which causes the nodal units associated with each lamp to assume a state in which the headlights are on. From the nodal units again, a control signal is passed to the headlight switch, which switches the headlights on.

In the solution illustrated in FIG. 2, the data to be read is 1-bit data. If 2-bit data is to be obtained from each nodal point, it is possible to connect two modification units 200 and two delay units 204 for each nodal unit. In this case, the control unit receives from each nodal unit two current impulses, each impulse having two possible amplitude values. Correspondingly, when N-bit information is needed about the state of the nodal unit, it is possible to connect N modification units and N delay units to each nodal unit.

FIG. 2 shows further how the network system can be connected via a desired interface means 220 to other networks or communication systems. For example, when the interface means 220 used is a modem, the information provided by the disclosed network system can be transmitted to a telephone network and through that almost anywhere in the world. Through the interface means, it is also possible to establish a connection with data networks, such as the Internet or a local network.

In the disclosed solution, there may be several separate sets of nodal units for one controller. Likewise, several controllers can be placed on a single microcircuit. Each controller may contain a microprocessor. In the disclosed solution, new nodal units can be added to an arrangement already in operation by placing the new nodal unit where desired, before, between or after the other nodal units, and configuring the control unit for the new nodal unit layout. As the control unit can be configured via software, no other changes need to be made in the circuits in addition to the connection of the nodal unit.

FIG. 3 presents a block diagram relating to the control of the state of the nodal point. The write signal is connected to the switch 300, whose state is controlled by the W signal (see FIG. 2) coming from the nodal units. The W signal closes the switch 300, i.e. triggers the switch 300 into the conducting state, when the DC voltage signal at each nodal unit is high, i.e. when switches 2006 and 2026 are conducting. Otherwise the switch 300 is open, i.e. in the non-conducting state. When the switch is conducting, the write signal WR is admitted to the nodal unit being read. The operation of the switch 300 can also be so controlled that the switch 300 will remain closed for a time slightly exceeding the read window, for example so that the switch is not opened until switches 2002 and 2022 in each nodal unit are closed in their turn. Similarly, the switch can be closed slightly before the read window. In these cases, the switch 300 can be controlled by signals U1-U2 or by using a predetermined delay.

FIG. 4 illustrates the effect of an impedance change on the intensity of the current signal in the nodal unit. In each nodal unit, the DC read signal is connected to a parallel circuit consisting of component 400 on one side and components 402 and 406 on the other side. Components 400 and 406 may be resistors or other components having an impedance. Component 402 may be a switch or other component whose impedance can be varied by electric control. Component 402 is in the same state as the device controlled by the nodal point, and a change in the state of component 402 causes a change in the state of the device controlled. If component 402 is in a high-impedance state (switch 402 is open), then the current will flow through component 400. If component 402, is in a low-impedance state (switch 402 is closed), then the electric current produced by the DC voltage used as a read signal will flow through both switch 402 and component 400. When component 420 is in the low-impedance state, the electric current is larger than when component 402 is in the high-impedance state. The size of the electric current may be so designed that, when 1-bit information is to be transferred, bit "1" may be represented by 20 mA and bit "0" may be represented by 10 mA. In this case, bit "1" may mean that component 402 is in the high-impedance state and bit "0" may mean that component 402 is in the low-impedance state. The advantages of the use of electric current as a read signal for reading the state of a nodal unit include the circumstance that the use of digital logic defines exactly the voltage levels used in the signaling in the network system, which limits the selection of voltages and reduces noise immunity. Electric current as a means of transmitting information is not noise sensitive and is not limited to any predetermined values. Current information also has a good immunity to voltage variations.

The state of component 402 can be changed by a write signal WR coming directly from the control unit or via an adapter, transmitted over a twin cable. The write signal WR is a pulse signal, and therefore the write signal is first fed into a toggle circuit 404, which keeps the state determined by the write signal as the control signal of component 402 after the write pulse so that the state of component 402 will not change until the next write signal arrives. The toggle circuit, which may a JK, RS, D or T toggle known in itself or some other corresponding toggle, needs a separate operating voltage V to be able to continuously maintain control of component 402. This solution also takes care of overload situations in such manner that, if component 402 is in or is being driven towards a state permitting the occurrence of an overload situation, component 402 will be caused to assume a state that helps reduce the overload situation or eliminates the overload situation.

FIG. 5 presents the pulse diagrams according to which the disclosed solution works. The DC signal is the analog direct-current voltage signal which is fed (starting from the rising edge) to all the nodal units when the state of the nodal units is to be read. An identical direct-current voltage signal can be fed to all nodal units because the state data of the nodal units can be distinguished from each other on the basis of time division. After the states have been measured, the direct-current voltage signal is reset to zero (falling edge of the DC signal) and the measurement does not consume any electric energy at all. At the rising edge of the DC signal, the control signal S1 to switch 2006 of the first modification unit 200 also changes so that switch 2006 is closed. As this switch is controlled by delay means 2004, the control signal S1 returns to its original state after a predetermined delay. Switch 2002 of modification unit 200 in turn is held open by control signal S2 from the rising edge of the direct-current voltage signal to the rising edge of supply U1. The length of the pulse is determined by the predetermined delay produced by delay means 2000. The delay produced by delay means 2000 may be twice as long the delay produced by delay means 2004. After switch 2002 has been closed and the direct voltage is passed on towards the second nodal unit, signal U1 goes high and nodal unit 104 stops consuming electricity. After the second nodal unit has been read and possibly written to, signal U2 goes high. Signal R represents the intensity of the current after the nodal units. The current rises at first to the current intensity level (e.g. 10 mA) representing the state of the first nodal unit. After this, the current intensity falls to a so-called 0 level, at which the nodal units are not read. From the 0 level, the current intensity returns to the level (e.g. 20 mA) corresponding to the state of the second nodal unit, whereupon it falls again to the 0 level. Since signal R changes all the time at regular intervals, it can be used e.g. in the adapter to generate a clock signal CLK for timing a data signal DATA. The duration of the clock signal may vary according to the nodal unit read time, which is determined by delay means 2004, 2024 and switches 2006, 2026. In FIG. 5, the read time of third nodal unit is longer than the read time of the two preceding nodal units. The DATA signal is a digital signal representing the states of the nodal units and its value varies according to the current signal. In this example, the DATA signal remains low while the first nodal unit is being read during signal S1, but when the second nodal unit is being read, it is high from the rising edge of signal U1. The last one is the write signal WR. In the example, the state of the first nodal unit is not changed, but the second nodal unit is to be brought into a state corresponding to bit "1". The WR signal may rise slightly before the read signal U1, and the WR signal may remain active for a time slightly longer than time during which the read time window of the second nodal unit remains active.

The switches needed in the disclosed solution can be implemented using electronic active components, such as semiconductor transistors, for example BJT (Bipolar Junction Transistor) or FET (Field Effect Transistor) transistors. The delay circuits can be implemented e.g. using active components and passive components, such as resistors, capacitors and coils.

Remarks Regarding Application of the Invention

Although the invention has been described above with reference to the example represented by the attached drawings, it is obvious that the invention is not limited to it, but that it can be varied in many ways within the scope of the following claims.

A person skilled in the art will understand that, for example in a case where a single circuit card or nodal unit contains a large number of receiving and/or sending interfaces, it may be preferable to manage or control the functions via software. Although the nodal units or nodes in themselves, at least in most of the conceivable applications, do not require a program in order to work, it will be advantageous in certain cases that, if such a node is of a nature requiring a processor, the same processor can also take care of the I/O processes. In this case, blocks 108, 104, 109 and 106 appearing in FIG. 1 as well as the delay, write and switch blocks 2000, 2002, 2004, 2006, 104, 2020, 2022, 2024, 2026 and 106 appearing in FIG. 2 of application could be implemented by the existing program of the processor or by using the program as an aid. For example, if the node comprises or is associated with a more complicated display or other device that in itself requires a processor, then such a device could, if it has a sufficient capacity, also take care of the I/O processes, thus perhaps allowing a certain cost advantage.

The skilled person will understand that the invention is well applicable for the implementation of the transfer of the data of call input devices, displays and guidance and signaling devices comprised in elevators, elevator groups, escalators and corresponding people mover systems, as well as for other data transfer, even wireless data transfer, required in elevators, elevator groups, escalators or corresponding people mover systems.

It is also obvious that, as the embodiments of the invention are not limited to the examples described above, the inventive content disclosed in the application can be applied in many different ways. In this application, different embodiments are not mutually exclusive; instead, where appropriate, the various features of different embodiments can be used in other embodiments either as additions or as substitutes for one or more features. Inventive content may also be found in the goal setting or sub-objectives as well as in the problem having led to the invention or likewise in the described sub-problems. Content of a nature relating to objectives or problems may have been presented explicitly or it appears implicitly from the context. The material disclosed in the invention comprises inventive content that can be defined in other ways than in the claims presented below.

The invention claimed is:

1. Signaling method for a network system, wherein a control unit communicates over a wired signaling channel with at least one nodal unit, each one of said nodal units being associated with at least one device to be monitored, and in which method the signaling is carried out over the signaling channel between each nodal unit and the control unit, the method comprising:

feeding a common analog read signal, which is a direct-current voltage signal of a desired level, to all nodal units via the signaling channel under control of the control unit;

serially reading the states of the nodal units one by one without a separate clock signal so that, at each nodal unit, the propagation of the direct-current voltage signal to the next nodal unit is delayed, by a modification unit, for a time exceeding the duration of the read operation whereby a different delay is associated with each nodal unit; and setting, within a predetermined read time window determined by a delay unit, the value of the electric current produced by the direct-current voltage signal in each nodal unit to a level corresponding to the state of the nodal unit according to the nodal unit's impedance across which the direct-current voltage signal is applied; and determining the state of each nodal unit in the control unit in serial mode based on the intensity value of the electric current signal received according to the different delays from each nodal unit, or setting the nodal unit to a desired state to control with a switch connected to the nodal unit.

2. Signaling method for a network system, wherein a control unit communicates over a wired signaling channel with at least one nodal unit, each one of said nodal units being associated with at least one device to be monitored, and in which method the signaling is carried out over the signaling channel between each nodal unit and the control unit, the method comprising:

feeding a common analog read signal to all nodal units via the signaling channel under control of the control unit;

serially reading the states of the nodal units;

modifying the read signal at each nodal unit for identification of the nodal unit in such manner that, at each nodal unit, the propagation of the read signal to the next nodal unit is delayed at least for a time exceeding a predetermined read time window, each nodal unit being associated with a different delay time;

adding, within the predetermined read time window, data indicating the state of each nodal unit to the read signal according to an impedance of each nodal unit, which changes according to the state of the nodal unit; and determining the state of the each nodal unit serially in the control unit based on the delays and the read signal, or setting the nodal unit to a desired state to control with a switch connected to the nodal unit.

3. Signaling method for a network system, wherein a control unit communicates over a wired signaling channel with at least one nodal unit, each one of said nodal units being associated with at least one device to be monitored, and in which method the signaling is carried out over the signaling channel between each nodal unit and the control unit, the method comprising:

feeding a common analog read signal to all nodal units via the signaling channel under control of the control unit;

reading the states of the nodal units in parallel mode while the analog read signal contains different frequencies;

modifying the read signal at each nodal unit for identification of the nodal unit so that at each nodal unit the frequency characteristics of the read signal are modified in a predetermined manner via filtering characteristic of each nodal unit;

adding information regarding the state of each nodal unit to the read signal by using an impedance of each nodal unit, which changes according to the state of the nodal unit; and determining the state of each nodal unit in parallel mode in the control unit based on the frequency filtering characteristic of each nodal unit and the read signal, or setting the nodal unit to a desired state to control with a switch connected to the nodal unit.

4. Method according to claim 1, wherein the states of the nodal units are set one by one in serial mode so as to allow a desired state of the nodal unit to be set in connection with the read time window.

5. Method according to claim 1, wherein the direct-current voltage signal is used as the operating voltage needed for the read operation.

6. Method according to claim 1, wherein the modification and delay units are integrated as parts of a nodal unit.

7. Method according to claim 1, wherein, when N-bit data is to be transferred, each nodal unit is associated with N modification units and N delay units, where N is a positive integer.

8. Method according to claim 1, wherein a clock signal is generated from the received read signal to allow timing of the read signal.

9. Method according to claim 1, wherein an apparatus applying the method is connected as a part of the rest of the network system.

10. Signaling apparatus for a network system, the apparatus comprising:

a control unit; and at least one nodal unit, wherein said control and nodal units communicate with each other over a wired signaling channel, and each of said nodal units is associated with at least one device to be monitored, and further wherein the control unit is configured to control the supply of a direct-current voltage signal used as an analog read signal to all the nodal units over the signaling channel, and, to allow the states of the nodal units to be read by the control unit without a separate clock signal;

modification units configured to delay the connection of the direct-current voltage signal at each nodal unit to the next nodal unit for a time exceeding the length of a read time window such that a different delay is associated with each nodal unit; and delay units configured to form said predetermined read time window, during which the direct-current voltage signal is connected to each nodal unit;

wherein each nodal unit comprises an impedance circuit corresponding to the state of the nodal unit, across which circuit the direct-current voltage signal is applied and whereby each nodal unit is configured to set, within said predetermined read time window, the value of the electric current produced by the direct-current voltage signal to a level corresponding to the state of the nodal unit, and further wherein the control unit is configured to either:

determine the state of each nodal unit in serial mode based on the intensity value of the electric current signal received according to different delays from each nodal unit, or set the nodal unit to a desired state to control with a switch, a device, or a component connected to the nodal unit.

11. Signaling apparatus for a network system, the apparatus comprising:

a control unit;

at least one nodal unit, wherein said control and nodal units communicate with each other over a wired signaling channel, and each of said nodal is associated with at least one device to be monitored; and further wherein the control unit is configured to control the supply of an analog read signal common to all the nodal units over the signaling channel; and a modifying unit that modifies the read signal at each nodal unit, thereby distinguishing the nodal units from each other;

wherein:

each nodal unit is configured to add data indicating its state to the read signal;

the control unit is a serial reading control unit that reads the states of the nodal units in serial mode; and further wherein the control unit is configured to determine the state of each nodal unit based on the read signal and the modification made by the modifying unit, and to set nodal units t to a desired state to control with a switch, a device or a component connected to the nodal unit;

each modifying unit modifies the read signal to allow identification of its associated nodal unit in such manner that each nodal unit delays the propagation of the read signal to the next nodal unit at least for a time exceeding a predetermined read time window, where the delay is different at each nodal unit;

each nodal unit adds, within the predetermined read time window, data indicating the state of said nodal unit to the read signal according to its impedance, which changes according to the state of the nodal unit; and the serial reading control unit is configured to determine the state of the each nodal unit based on the delays and the read signal.

12. Signaling apparatus for a network system, the apparatus comprising:

a control unit;

at least one nodal unit, wherein said control and nodal units communicate with each other over a wired signaling channel, and each of said nodal is associated with at least one device to be monitored; and further wherein the control unit is configured to control the supply of an analog read signal common to all the nodal units over the signaling channel; and a modifying unit that modifies the read signal at each nodal unit, thereby distinguishing the nodal units from each other; wherein:

the control unit is a parallel reading control unit that reads the states of the nodal units in parallel mode while the analog read signal contains different frequencies;

each nodal unit is configured to add data indicating its state to the read signal; and further wherein the control unit is configured to determine the state of each nodal unit based on the read signal and the modification made by the modifying unit, and to set nodal units t to a desired state to control with a switch, a device or a component connected to the nodal unit;

each modifying unit modifies the read signal at its associated nodal unit to allow identification of the nodal unit so that at each nodal unit the frequency characteristics of the read signal are modified in a predetermined manner via a filtering characteristic of each nodal unit;

each nodal unit adds information regarding the state of said nodal unit to the read signal by using its impedance, which changes according to the state of the nodal unit, and the parallel reading control unit is configured to deter-mine the state of each nodal unit based on the frequency filtering characteristic of each nodal unit and the read signal.

13. Apparatus according to claim 10, wherein:

modification units each contain a first delay units and first switching units, further wherein the first delay units are configured to delay the connection of the direct-current voltage signal by the switching units at each nodal unit to the next nodal unit for a time exceeding the duration of the read time window; and the delay units each comprise a second delay unit and a second switching unit, wherein the second delay unit is configured to form a predetermined read time window, and the second switching unit is configured to connect the direct-current voltage signal to each nodal unit during said read time window.

14. Apparatus according to claim 10, further comprising a twin cable signaling channel for performing the reading of the nodal units.

15. Apparatus according to claim 10, further comprising:

a write signaling channel that sets the states of the nodal units one by one in serial mode, thereby setting the nodal unit to the desired state in connection with the read time window.

16. Apparatus according to claim 10, wherein, in an arrangement transmitting N-bit information each nodal unit has N modification units and N delay units connected to it, where N is a positive integer.

17. Apparatus according to claim 10, the signaling channel comprising a twin cable that enables the setting of the state of the nodal units to be carried out.

18. Apparatus according to claim 10, wherein the modification units and delay units are integrated as parts of the nodal units.

19. Apparatus according to claim 10, wherein the apparatus is configured to generate a clock signal from the received read signal to allow timing of the read signal.

20. Apparatus according to claim 10, 11, or 12 wherein the apparatus is connected as part of the rest of the network system.

21. Method according to claim 7, wherein said N-bit data is stored in the phrase of the read signal.

22. Apparatus according to claim 16, wherein each nodal modifies the phase of the read signal to store at least part of said N-bit data therein.

23. Method according to claim 2, wherein adding new nodal units may be accomplished without changing the circuits and connections of current nodal units.

24. Apparatus of claim 11, wherein the connection and wiring scheme of the apparatus is such that new nodal units may be introduced into the apparatus without changing the circuits and connections of nodal units already in the apparatus.

25. Method according to claim 3, wherein adding new nodal units may be accomplished without changing the circuits and connections of current nodal units.

26. Apparatus of claim 12, wherein the connection and wiring scheme of the apparatus is such that new nodal units may be introduced into the apparatus without changing the circuits and connections of nodal units already in the apparatus.

* * * * *